United States Patent
Parameswaran et al.

(10) Patent No.: US 12,461,933 B2
(45) Date of Patent: Nov. 4, 2025

(54) ENTERPRISE RESOURCE PLANNING DATABASE EXTRACTION, TRANSFORMATION, AND ANALYSIS

(71) Applicants: EY Global Delivery Services India LLP, Bangalore (IN); Ernst & Young LLP, New York, NY (US)

(72) Inventors: Ramesh Parameswaran, Bangalore (IN); Sukesh Choubey, Bangalore (IN); Ramkumar Srinivasan, TamilNadu (IN); Debajyoti Bhattacharya, Bangalore (IN)

(73) Assignee: EYGS LLP, London (GB)

( * ) Notice: Subject to any disclaimer, the term of this patent is extended or adjusted under 35 U.S.C. 154(b) by 0 days.

(21) Appl. No.: 17/958,980

(22) Filed: Oct. 3, 2022

(65) Prior Publication Data

US 2024/0111780 A1   Apr. 4, 2024

(51) Int. Cl.
  *G06F 16/26*   (2019.01)
  *G06F 16/23*   (2019.01)
  *G06F 16/25*   (2019.01)

(52) U.S. Cl.
  CPC .......... *G06F 16/26* (2019.01); *G06F 16/2358* (2019.01); *G06F 16/258* (2019.01)

(58) Field of Classification Search
  CPC ........................... G06F 16/258; G06F 16/2358
  See application file for complete search history.

(56) References Cited

U.S. PATENT DOCUMENTS

| 7,162,438 B1 | 1/2007 | Kelly |
| 2015/0178368 A1* | 6/2015 | Brackett ............... G06F 16/284 707/758 |

(Continued)

FOREIGN PATENT DOCUMENTS

| EP | 2541413 A1 * | 1/2013 | .......... G06F 11/0751 |
| WO | WO-2007131075 A2 * | 11/2007 | .......... G05B 23/024 |

(Continued)

OTHER PUBLICATIONS

Bozkaya et al., "Process Diagnostics: A Method Based on Process Mining," Information, Process, and Knowledge Management, Feb. 1, 2009, pp. 22-27.

(Continued)

*Primary Examiner* — Apu M Mofiz
*Assistant Examiner* — J Mitchell Curran
(74) *Attorney, Agent, or Firm* — COOLEY LLP

(57) ABSTRACT

In an embodiment, a transaction dataset is analyzed to identify a set of transaction events, each transaction event from the set of transaction events associated with a transaction event type. The set of transaction events is analyzed to identify a plurality of sets of grouped transaction events, each set of grouped transaction events from the plurality of sets of grouped transaction events associated with a subset of transaction events from the set of transaction events. To identify a plurality of sets of variants, each set of grouped transaction events from the plurality of sets of grouped transaction events including an identifier of a variant for that set of grouped transaction events and from the plurality of sets of variants is analyzed, each set of variants from the plurality of sets of variants differing from each remaining set of variants from the plurality of sets of variants.

20 Claims, 10 Drawing Sheets

(56) References Cited

U.S. PATENT DOCUMENTS

| | | | |
|---|---|---|---|
| 2015/0227582 A1* | 8/2015 | Gu | G06F 16/2453 |
| | | | 707/713 |
| 2016/0317865 A1* | 11/2016 | Acosta | A63B 21/00065 |
| 2018/0121840 A1 | 5/2018 | Sitina | |
| 2019/0102442 A1* | 4/2019 | Daga | G06Q 10/04 |
| 2020/0151166 A1 | 5/2020 | Shekhar | |
| 2020/0233557 A1 | 7/2020 | Sato et al. | |
| 2020/0233857 A1 | 7/2020 | Fehling et al. | |
| 2021/0041849 A1 | 2/2021 | Rinke et al. | |
| 2021/0158268 A1* | 5/2021 | Berg | G06F 16/2465 |
| 2021/0286658 A1 | 9/2021 | Copier | |

FOREIGN PATENT DOCUMENTS

| | | | |
|---|---|---|---|
| WO | WO-2020201830 A1 * | 10/2020 | |
| WO | WO-2024076992 A1 | 4/2024 | |

OTHER PUBLICATIONS

Hoang et al., "Business Process Deviance Mining: Review and Evaluation," ARXIV.org, Aug. 29, 2016, 18 pages.

Mieke et al., "How Active Learning and Process Mining Can Act as Continuous Auditing Catalyst," Intl Journal of Accounting Information Systems, Mar. 2019, vol. 32, pp. 44-58.

Schrijver, "Using Process Mining to Compare Different Variants of the Same Reimbursement Process: A Case Study," 33rd Twente Student Conference On IT, Jul. 3, 2020, pp. 1-8.

International Search Report and Written Opinion in Intl. App. No. PCT/US2023/075839, mailed Dec. 1, 2023, 16 pages.

* cited by examiner

Case Details

Variants: PRM-POM-IND-GRN-INV-PAG

Select case: 0030870844-00010-B1

Net Value: $59

Cycle time: 525 days

Case Flow:
PRM → 0 days → POM → 5 days → IND → 0 days → GRN → 519 days → INV → 0 days → PAF Refresh Case 0030870844-00010-B1 – Event Details Pivot table     Add attribute

| Event Name | T - Code | User Name | Document # | Document Item # | Time of Processing |
|---|---|---|---|---|---|
| PRM | ME51N | Unit Andorra | 0030870844 | 00010 | 28-03-2019 18:30 |
| POM | ME59N | Unit Bermuda | 4500459551 | 00010 | 29-03-2019 04:06 |
| IND | VL31N | | 0180297215 | 000010 | 03-04-2019 2:11 |
| GRN | MIGO | Unit French | 5001398657 | 0001 | 03-04-2019 08:23 |
| INV | ZVER_MIRO | Unit Venezue | 5120021302 | 0001 | 03-09-2020 04:09 |
| PAF | F110 | Unit Armenia | 0002076425 | 003 | 03-09-2020 08:05 |

FIG. 5

```
┌─────────────────────────────────────────────────────────────────────────┐
│ Analyzing a transaction dataset to identify a set of transaction        │
│ events, each transaction event from the set of transaction events       │
│ associated with a transaction event type from a set of transaction      │
│ event types 801                                                         │
└─────────────────────────────────────────────────────────────────────────┘
                                    ↓
┌─────────────────────────────────────────────────────────────────────────┐
│ Analyzing, based on associations between transaction events from        │
│ the set of transaction events, the set of transaction events to         │
│ identify a plurality of sets of grouped transaction events, each set    │
│ of grouped transaction events associated with a subset of transaction   │
│ events from the set of transaction events 802                           │
└─────────────────────────────────────────────────────────────────────────┘
                                    ↓
┌─────────────────────────────────────────────────────────────────────────┐
│ Analyzing, to identify a plurality of sets of variants, each set of     │
│ grouped transaction events from the plurality of sets of grouped        │
│ transaction events including an identifier of a variant for that set    │
│ of grouped transaction events and from the plurality of sets of         │
│ variants, each set of variants from the plurality of sets of variants   │
│ differing from each remaining set of variants from the plurality of     │
│ sets of variants 803                                                    │
└─────────────────────────────────────────────────────────────────────────┘
                                    ↓
┌─────────────────────────────────────────────────────────────────────────┐
│ Analyzing the plurality of sets of variants to identify (1) a subset    │
│ of standard variants from the plurality of sets of variants having a    │
│ standard sequence of transaction event types, (2) a subset of           │
│ non-standard variants from the plurality of sets of variants having a   │
│ non-standard sequence of transaction event types, and (3) a subset of   │
│ incomplete variants from the plurality of sets of variants having an    │
│ incomplete sequence of transaction event types 804                      │
└─────────────────────────────────────────────────────────────────────────┘
                                    ↓
┌─────────────────────────────────────────────────────────────────────────┐
│ Causing display of at least one of a representation quantifying the     │
│ subset of standard variants, a representation quantifying the subset    │
│ of non-standard variants, or a representation quantifying the subset    │
│ of incomplete variants 805                                              │
└─────────────────────────────────────────────────────────────────────────┘
                                    ↓
┌─────────────────────────────────────────────────────────────────────────┐
│ Identifying a set of metrics associated with each set of variants       │
│ from the plurality of sets of variants 806                              │
└─────────────────────────────────────────────────────────────────────────┘
                                    ↓
┌─────────────────────────────────────────────────────────────────────────┐
│ Causing display of a representation of the set of metrics 807           │
└─────────────────────────────────────────────────────────────────────────┘
```

Analyzing a plurality of transaction events to identify a first set of grouped transaction events, the first set of grouped transaction events including a first sequence of transaction event types, and the first sequence of transaction event types including a first transaction event type followed by a second transaction event type followed by a third transaction event type 901

Analyzing the plurality of transaction events to identify a second set of grouped transaction events, the second set of grouped transaction events including a second sequence of transaction event types, and the second sequence of transaction event types including a fourth transaction event type followed by a fifth transaction event type followed by a sixth transaction event type 902

Determining, and based on the first sequence of transaction event types, that the first set of grouped transaction events is associated with a first variant 903

Determining, based on the second sequence of transaction event types, that the second set of grouped transaction events is associated with a second variant 904

Determining a first set of time durations, the first set of time durations including (1) a time duration between the first transaction event type and the second transaction event type, and (2) a time duration between the second transaction event type and the third transaction event type 905

Determining a second set of time durations, the second set of time durations including (1) a time duration between the fourth transaction event type and the fifth transaction event type, and (2) a time duration between the fifth transaction event type and the sixth transaction event type 906

Causing display of a representation of the first sequence of transaction event types and the first set of time durations 907

Causing display of a representation of the second sequence of transaction event types and the second set of time durations 908

FIG. 9

ENTERPRISE RESOURCE PLANNING DATABASE EXTRACTION, TRANSFORMATION, AND ANALYSIS

FIELD

One or more embodiments are related to enterprise resource planning (ERP) database extraction, transformation, and analysis.

BACKGROUND

An enterprise resource planning (ERP) database can be associated with data representing large quantities of events. Those events may contain useful information, but those events may be in a database and/or form that is less than desirable for identifying the useful information.

SUMMARY

In an embodiment, a non-transitory processor-readable medium stores code representing instructions to be executed by one or more processors. The instructions comprise code to cause the one or more processors to receive transaction data associated with a process. The transaction data is filtered from a database including data associated with a plurality of processes that includes the process. The instructions further comprise code to cause the one or more processors to analyze the transaction data to identify a set of transaction events. Each transaction event from the set of transaction events is associated with a transaction event type from a set of transaction event types. The instructions further comprise code to cause the one or more processors to analyze the set of transaction events to identify a plurality of sets of grouped transaction events. Each set of grouped transaction events from the plurality of sets of grouped transaction events includes a subset of transaction events from the set of transaction events. The instructions further comprise code to cause the one or more processors to analyze, to identify a plurality of sets of variants, each set of grouped transaction events from the plurality of sets of grouped transaction events including an identifier of a variant for that set of grouped transaction events. Each set of variants from the plurality of sets of variants differ from each remaining set of variants from the plurality of sets of variants. The instructions further comprise code to cause the one or more processors to analyze the plurality of sets of variants to identify a set of variants from the plurality of sets of variants not having a standard sequence of transaction event types. The instructions further comprise code to cause the one or more processors to calculate a first set of metric values associated with the set of variants. The instructions further comprise code to cause the one or more processors to calculate a second set of metric values associated with a set of grouped transaction events associated with the set of variants. The instructions further comprise code to cause the one or more processors to determine that at least one of (1) the first set of metric values is outside a first predetermined acceptable range, or (2) the second set of metric values is outside a second predetermined acceptable range. The instructions further comprise code to cause the one or more processors to send, in response to the determining, a signal to cause a remedial action to be performed.

In an embodiment, a method comprises analyzing, via a processor, a transaction dataset to identify a set of transaction events. Each transaction event from the set of transaction events is associated with a transaction event type from a set of transaction event types. The method further comprises analyzing, via the processor and based on associations between transaction events from the set of transaction events, the set of transaction events to identify a plurality of sets of grouped transaction events. Each set of grouped transaction events from the plurality of sets of grouped transaction events is associated with a subset of transaction events from the set of transaction events. The method further comprises analyzing, via the processor and to identify a plurality of sets of variants, each set of grouped transaction events from the plurality of sets of grouped transaction events including an identifier of a variant for that set of grouped transaction events and from the plurality of sets of variants. Each set of variants from the plurality of sets of variants differs from each remaining set of variants from the plurality of sets of variants. The method further comprises analyzing, via the processor, the plurality of sets of variants to identify (1) a subset of standard variants from the plurality of sets of variants having a standard sequence of transaction event types, (2) a subset of non-standard variants from the plurality of sets of variants having a non-standard sequence of transaction event types, and (3) a subset of incomplete variants from the plurality of sets of variants having an incomplete sequence of transaction event types. The method further comprises causing, via the processor, display of at least one of a representation quantifying the subset of standard variants, a representation quantifying the subset of non-standard variants, or a representation quantifying the subset of incomplete variants. The method further comprises identifying, via the processor, a set of metrics associated with each set of variants from the plurality of sets of variants. The method further comprises causing, via the processor, display of a representation of the set of metrics.

In an embodiment, an apparatus comprises a memory and a processor operatively coupled to the memory. The processor is configured to analyze a plurality of transaction events to identify a first set of grouped transaction events from the plurality of transaction events. The first set of grouped transaction events includes a first sequence of transaction event types, where the first sequence of transaction event types includes a first transaction event type followed by a second transaction event type followed by a third transaction event type. The processor is further configured to analyze the plurality of transaction events to identify a second set of grouped transaction events from the plurality of transaction events. The second set of grouped transaction events includes a second sequence of transaction event types, where the second sequence of transaction event types includes a fourth transaction event type followed by a fifth transaction event type followed by a sixth transaction event type. The processor is further configured to determine, based on the first sequence of transaction event types, that the first set of grouped transaction events is associated with a first variant. The processor is further configured to determine, based on the second sequence of transaction event types, that the second set of grouped transaction events is associated with a second variant. The processor is further configured to determine a first set of time durations, the first set of time durations including (1) a time duration between the first transaction event type and the second transaction event type, and (2) a time duration between the second transaction event type and the third transaction event type. The processor is further configured to determine a second set of time durations, the second set of time durations including (1) a time duration between the fourth transaction event type and the fifth transaction event type, and (2) a time duration between the fifth transaction event type and the sixth transaction event type. The processor is further configured to cause display of a representation of the first sequence of transaction event types and the first set of time durations. The processor is further configured to cause display of a representation of the second sequence of transaction event types and the second set of time durations.

BRIEF DESCRIPTION OF THE DRAWINGS

FIG. 5 shows various metrics from a process analysis output, according to an embodiment.

FIG. 8 shows a flowchart of a method for identifying and displaying metrics associated with variants, according to an embodiment.

FIG. 9 shows a flowchart of a method for identifying and displaying metrics associated with variants, according to an embodiment.

FIG. 10 shows a flowchart of a method for identifying and displaying metrics associated with variants, according to an embodiment.

DETAILED DESCRIPTION

Some management systems, like enterprise resource planning (ERP) systems, maintain a record of most and/or all business transactions (e.g., sale orders, production orders, invoices, etc.) for a group(s) (e.g., an organization, a company, and/or the like). By examining these records, business intelligence can be derived, including reconstruction of business process(es), checking for completion of records, conformance to auditing standards, and/or the like. Some implementations herein are related to analyzing an ERP database to extract these ERP data transactions, identifying the occurrence of specific business transactions based on these ERP data transactions, creating patterns of these transactions, and/or performing one or more remedial actions based on the patterns. Some implementations include running a software model in a business management system (e.g., client's system), where the software model can consolidate similar types of transactions generated over a period of time and build patterns. This can help the client to visualize the process flow of business transactions; gain insights that otherwise may not be discovered; identify standard, non-standard and incomplete transaction flows; perform remedial actions to mitigate undesirable practices; and/or the like.

Some implementations herein are related to using data that is from a database (e.g., ERP database) and that has been extracted and transformed. By selectively extracting data, the amount of data that is to be stored, sent, transformed, and/or analyzed is reduced, thereby enabling a compute device(s) to operate faster, more efficiently, more accurately, and/or the like. Additionally, transforming the data from, for example, an ERP database, can allow the transformed data to be analyzed in a system (e.g., SAP HANA® system) that may be more desirable (e.g., more compatible, able to perform additional features, and/or the like) but otherwise not usable if the data was not transformed.

Figure 1:
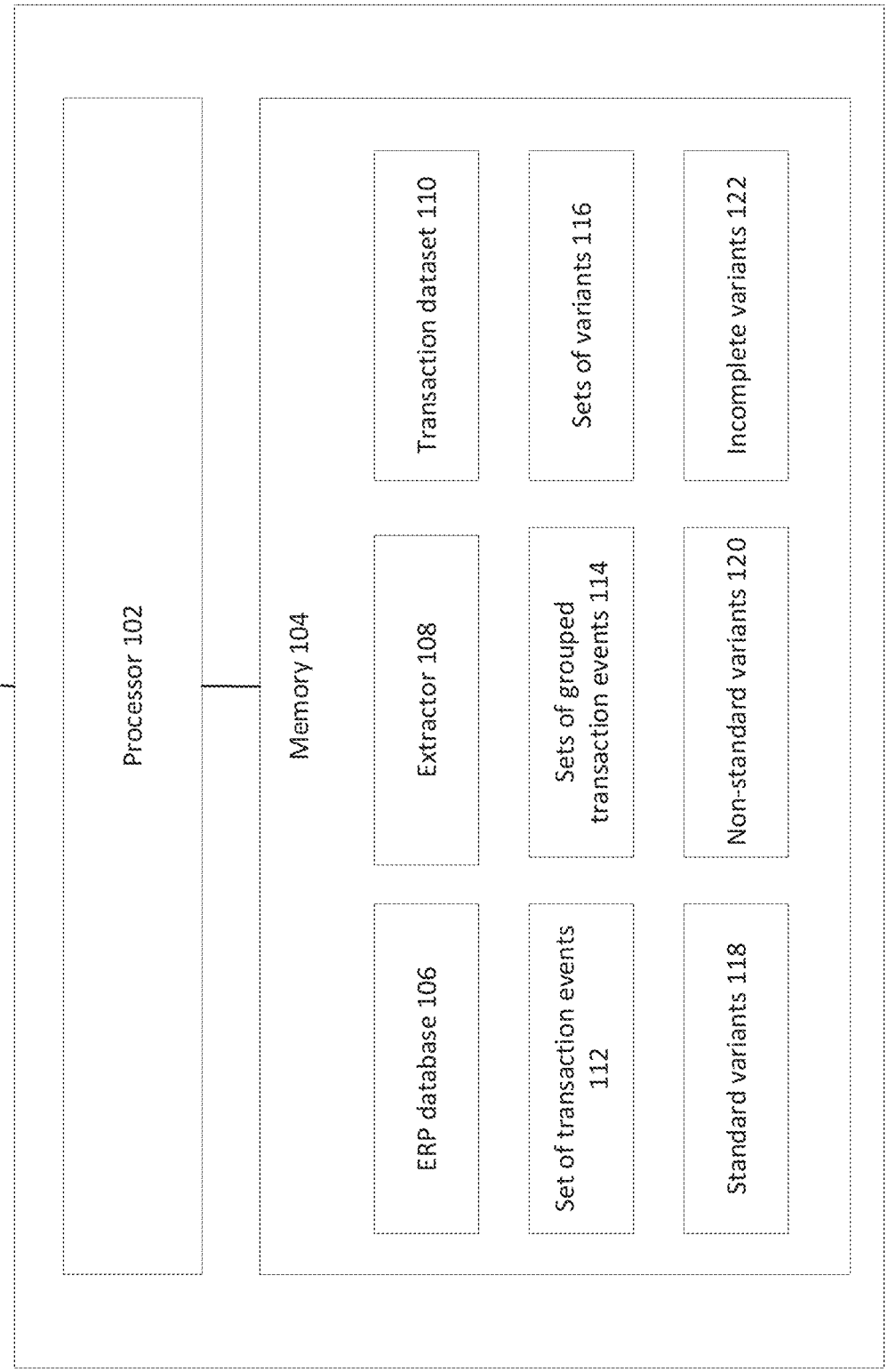
FIG. 1 shows a block diagram of a process analysis compute device, according to an embodiment.

FIG. 1 shows a block diagram of a process analysis (PA) compute device 100, according to an embodiment. The PA compute device 100 includes a processor 102 operatively coupled to a memory 104 (e.g., via a system bus). The PA compute device 100 can be any type of compute device, such as a server, laptop, desktop, tablet, phone, and/or the like.

The processor 102 can be, for example, a hardware-based integrated circuit (IC) or any other suitable processing device configured to run and/or execute a set of instructions or code. For example, the processor 102 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 102 can be configured to run any of the methods and/or portions of methods discussed herein.

The memory 104 can be, for example, a random-access memory (RAM), a memory buffer, a hard drive, a read-only memory (ROM), an erasable programmable read-only memory (EPROM), and/or the like. The memory 104 can be configured to store any data used by the processor 102 to perform the techniques discussed herein. In some instances, the memory 104 can store, for example, one or more software programs and/or code that can include instructions to cause the processor 102 to perform one or more processes, functions, and/or the like. In some implementations, the memory 104 can include extendible storage units that can be added and used incrementally. In some implementations, the memory 104 can be a portable memory (for example, a flash drive, a portable hard disk, and/or the like) that can be operatively coupled to the processor 102. In some instances, the memory 104 can be remotely operatively coupled with a compute device (not shown in FIG. 1).

The memory 104 can store a representation of enterprise resource planning (ERP) database 106 and an extractor 108. The ERP database 106 can represent a record of most and/or all business transactions (e.g., sale orders, production orders, post good returns, invoices etc.) for a group(s) (e.g., an organization, a company, and/or the like). The ERP database 106 can include data from multiple different processes, such as for example a procurement process, a production process, a distribution process, an accounting process, a human resource process, a sales process, a customer service process, and/or the like. The extractor 108 can be a software model that can extract only the information that is required and/or used to perform a desired (e.g., as indicated by a user) process analysis from the ERP database 106 (e.g., for just a procurement process, for just a production and distribution process, etc.), and convert the extracted information into a format acceptable to perform analysis of the process(es) (or subprocess(es)); this converted extracted information is represented as the transaction dataset 110. In some implementations, the extractor 108 receives and/or obtains data (e.g., in substantially real time from ERP database 106 and/or a compute device(s) not shown in FIG. 1), and converts (e.g., in substantially real time) the received data into a standard format (e.g., SAP HANA® format).

In some implementations, the ERP database 106 is saved in tabular format. The extractor 108 is a software program/model (e.g., installed in and/or having access to the ERP database 106) configured to extract data (e.g., table data)

from the ERP database 106 into a modified format (e.g., a .csv file, a text file, etc.) that can be analyzed. For example, the extractor 108 can include capability to use various filters like date range, enterprise structure (primary key), system ID, and/or the like to extract desired sets of data for a specific business process that will undergo process mining and not remaining sets of data. This reduces the size of the data to be extracted out of the ERP system, and in turn, decreases the amount of data that is to be analyzed during analysis of a process. For example, when the extractor 108 is executed, the extractor 108 can extract the required (or desired) tables from ERP database 106 as per a business process area (e.g., procure to pay, order to cash, record to report, and/or the like). Data can also then be written into a desirable format by the extractor 108.

The process of extracting and converting from the ERP database 106 to the transaction dataset 110 can result in a transformed dataset that can (1) reduce the amount of data to be processed to perform analysis of a process (i.e., process analysis) because the information that is required (or desired) for performing the analysis is extracted and remaining information is not, (2) reduce the amount of time used to perform the analysis because a smaller amount of data is to be processed, and/or (3) increase an accuracy of the analysis because the transaction dataset 110 is in a modified (e.g., more desirable and/or compatible) format. As such, the step of extracting and converting from the ERP database 106 to the transaction dataset 110 improves a functioning of the process analysis compute device 100 (e.g., compared to not extracting and/or converting from the ERP database 106 to the transaction dataset 110 before performing an analysis).

The transaction dataset 110 can be associated with (e.g., included in, used by, and/or accessible by) an in-memory, column-oriented, relational database management system (e.g., SAP HANA®). The transaction dataset 110 can include representations of transactions that were (1) logged at an ERP system associated with the ERP database 106 and/or (2) associated with a process(es) that is to be analyzed, such as a procurement process, a production process, a distribution process, an accounting process, a human resource process, a sales process, a customer service process, and/or the like. The transaction dataset 110 can include representations of transaction events. In some implementations, a transaction event refers to a step(s) of a transaction, and can be associated with a transaction event type, such as a purchase requisition (PR), purchase order (PO), goods receipt (GR), post good return (PGR), invoice, down payment requiring clearing (DPC), contracts approval (COA), goods receipt goods receipt (REC), goods receipt for purchase order reversal (REV), goods receipt into blocked stack (GTB), goods receipt to blocked revenue (GTR), goods receipt from blocked stack (GFB), goods receipt from blocked revenue (GFR), goods receipt to value blocked stock (TVS), goods receipt to value blocked revenue (TVR), goods receipt from value blocked stock (FVS), goods receipt from value blocked revenue (FVR), goods receipt subsequent adjustment (GQA), request return to vendor (RRV), request return vendor revenue (RVR), goods receipt return blocked stack (GRB), goods return blocked stack revenue (GR), goods receipts (GRC), goods receipt (GDB), goods receipt good subsequent adjustment (GSC), goods receipt good subsequent adjustment (GSD), goods receipt returns (GRT), goods receipt returns reversal (GRE), invoice credit/debit (ICD), credit memo (ICR), invoice (IDB), subsequent credit/debit ((SCD), subsequent credit (SCR), subsequent debit (SDV), downpayment credit/debit (DCD), downpayment credit (DCR), downpayment debit (DDB), payment (PAY), goods invoice consignment lending (GCL), goods invoice consignment return delivery (GCR), goods invoice whose subc stock (WSS), deliver stock transfer (DEL), service entry sheet credit/debit (ECD), service entry sheet credit (SEC), service entry sheet debit (SED), request for quotation (RFQ), request for quotation approval (RFA), request for quotation change (RFC), request for quotation sending (RFS), purchase requisition (REQ), purchase requisition for stock material (PRM), purchase requisition for consumables/project/order (PRC), purchase requisition for services (PRS), purchase requisition for subcontracting (PRN), purchase requisition approve (PRA), purchase requisition change (PRH), payment clearing credit (PCC), payment clearing debit (PCD), down payment request (DPR), purchase order (POR), purchase order for stock material (POM), purchase order for services (POS), purchase order for subcontracting (PSC), framework order blanket purchase order (BPO), purchase order approve (POA), purchase order change (POH), purchase order sending (POE), full goods receipt (GRN), inbound delivery (IND), full invoice (INV), contract (CON), contract change (COC), contract sending (COS), scheduling agreement (SAG), scheduling agreement approve (SAA), scheduling agreement changes (SAC), scheduling agreement sending (SAS), full payment (PAF), invoice parking credit (IPC), physical inventory document (PID), invoice parking debit (IPD), quality management create certificate (QCT), quality management create inspection lot (QIL), quality management result recording (QRR), quality management create sample (QSM), quality management stock posting (QSP), quality management usage decision (QUD), return delivery (RDL), return to vendor (RTV), reservation (RSN), purchase order for consumable/project/order (POC), and/or the like. Each transaction event from the transaction dataset 110 can also be associated with other information, such as a transaction ID of the transaction event, document/document category associated with (e.g., used to execute) the transaction event, a preceding document associated with (e.g., that led to) the transaction event, a succeeding document associated with (e.g., that followed) the transaction event, and/or the like.

The transaction dataset 110 can be used to identify a set of transaction events 112. The set of transaction events 112 can include all or some of the transaction events included in the transaction dataset 110. In other words, the set of transaction events 112 can include all events included in the transaction dataset 110, or a subset of events included in the transaction dataset 110. For example, the set of transaction events 112 can include all transactions from the transaction dataset 110 that are associated with a predetermined set of event types, such as those transaction events with event type PR, PO, GR, PGR, or invoice and not remaining event type(s).

The set of transaction events 112 can be used to generate sets of grouped transaction events 114 (also referred to herein as "cases", where each set of grouped transaction events is a "case"). Transaction events within the set of transaction events 112 can be associated with (e.g., linked to, referenced to, referenced by, precede, succeed, etc.) other transaction events. For example, a purchase order may be linked to a preceding transaction event that is a purchase requisition, and to a succeeding transaction event that is a goods receipt. In some implementations, each set of grouped transaction events from the sets of grouped transaction events 114 can include transaction events from the set of transaction events 112 that are linked (i.e., chained) together. For example, a set of grouped transaction events from the sets of grouped transaction events 114 can include a first transaction event, a second transaction event linked to the first transaction event, and a third transaction event linked to the second transaction event (with or without being linked to the first transaction event).

For each group of transaction events from the sets of grouped transaction events 114, a variant of that group of transaction events can be identified. In some implementations, a variant refers to a group of transaction events having a pattern of transaction event types. For example, a first set of variants from the sets of variants 116 can be associated with all groups of transaction events from the sets of grouped transaction events 114 having event types following a first pattern (e.g., PR followed by PO followed by GR followed by invoice), and a second set of variant from the sets of variants 116 can be associated with all groups of transaction events from the sets of grouped transaction events 114 having event types following a second pattern (e.g., PO followed by GR followed by invoice).

The sets of variants 116 can then be used to determine standard variants 118, non-standard variants 120, and/or incomplete variants 122. In some implementations, indications of variants that are to be considered standard, non-standard, and/or incomplete can be provided. For example, a user can provide indications of variants that are to be considered standard, non-standard, and/or incomplete. As another example, best practices for the ERP database 106 (e.g., provided by an organization associated with the ERP database 106) can be used to define standard, non-standard, and incomplete variants. In some implementations, standard variants 118 can refer to variants having a pattern of transaction event types predetermined as standard, and non-standard variants 120 can refer to variants having a pattern of transaction event types predetermined as non-standard. In some implementations, incomplete variants 122 can refer to variants having a pattern of transaction event types that are missing an event type. For example, in some implementations, all variants not having an invoice can be considered an incomplete variant. As example, in some implementations, all variants not having a purchase order can be considered an incomplete variant.

The PA compute device 100 can also be configured to identify metrics associated with (e.g., based on, characterizing) the transaction dataset 110, set of transaction events 112, sets of grouped transaction events 114, sets of variants 116, standard variants 118, non-standard variants 120, and/or incomplete variants 122. For example, a metric indicating a count of transaction events included in the transaction dataset 110, set of transaction events 112, sets of grouped transaction events 114, sets of variants 116, standard variants 118, non-standard variants 120, and/or incomplete variants 122 can be calculated. As another example, a time associated with the sets of grouped transaction events 114 and/or sets of variants 116 can be determined, such as a total time of a given set of grouped transaction events or duration of time between a pair of transaction events in a given set of grouped transaction events. Additional examples of metrics that can be calculated are shown and discussed with respect to FIGS. 3-7.

The PA compute device 100 can also be configured to perform one or more remedial actions. In some implementations, if a calculated metric is outside an associated predetermined acceptable range, a remedial action can occur. An example of a remedial action is causing an alert to be generated (e.g., at PA compute device 100 and/or a compute device not shown in FIG. 1). For instance, an alert can be generated for a factory manager so that the factory manager can further investigate for any potential issues.

Another example of a remedial action is cancelling and/or preventing a transaction (e.g., a future transaction). For example, if the number of non-standard or incomplete variants is greater than a predetermined threshold, all future transactions can be prevented. This can look like, for example, modifying a website where the future transactions are to occur, or disabling a compute device from receiving/executing the future transaction, and/or the like.

Another example of a remedial action is causing a new transaction event to occur. For example, for all variants that are incomplete for missing a particular transaction event (e.g., invoice), the PA compute device 100 can cause that particular transaction event to occur (or be performed).

In some implementations, the ERP database 106 is updated over time as additional transactions occur. In some implementations, an updated version of transaction dataset 110 can be generated as the additional transaction occur (e.g., in substantially real time). In some implementations, an updated version of transaction dataset 110 can be generated at predefined intervals of time (e.g., every hour, every day, every week, every month, every quarter, every year, etc.).

Although FIG. 1 showed a single compute device, in some implementations, additional compute device are implemented. For example, a second compute device can store the ERP database 106 and extractor 108 (instead of the PA compute device 100). The second compute device can send a signal representing the transaction dataset 110 to the PA analysis compute device 100 over a network (not shown). As such the PA compute device 100 does not have to store the ERP database 106 and/or extractor 108, which can reduce the amount of memory and/or processing power the PA compute device 100 needs and/or uses.

Figure 2:
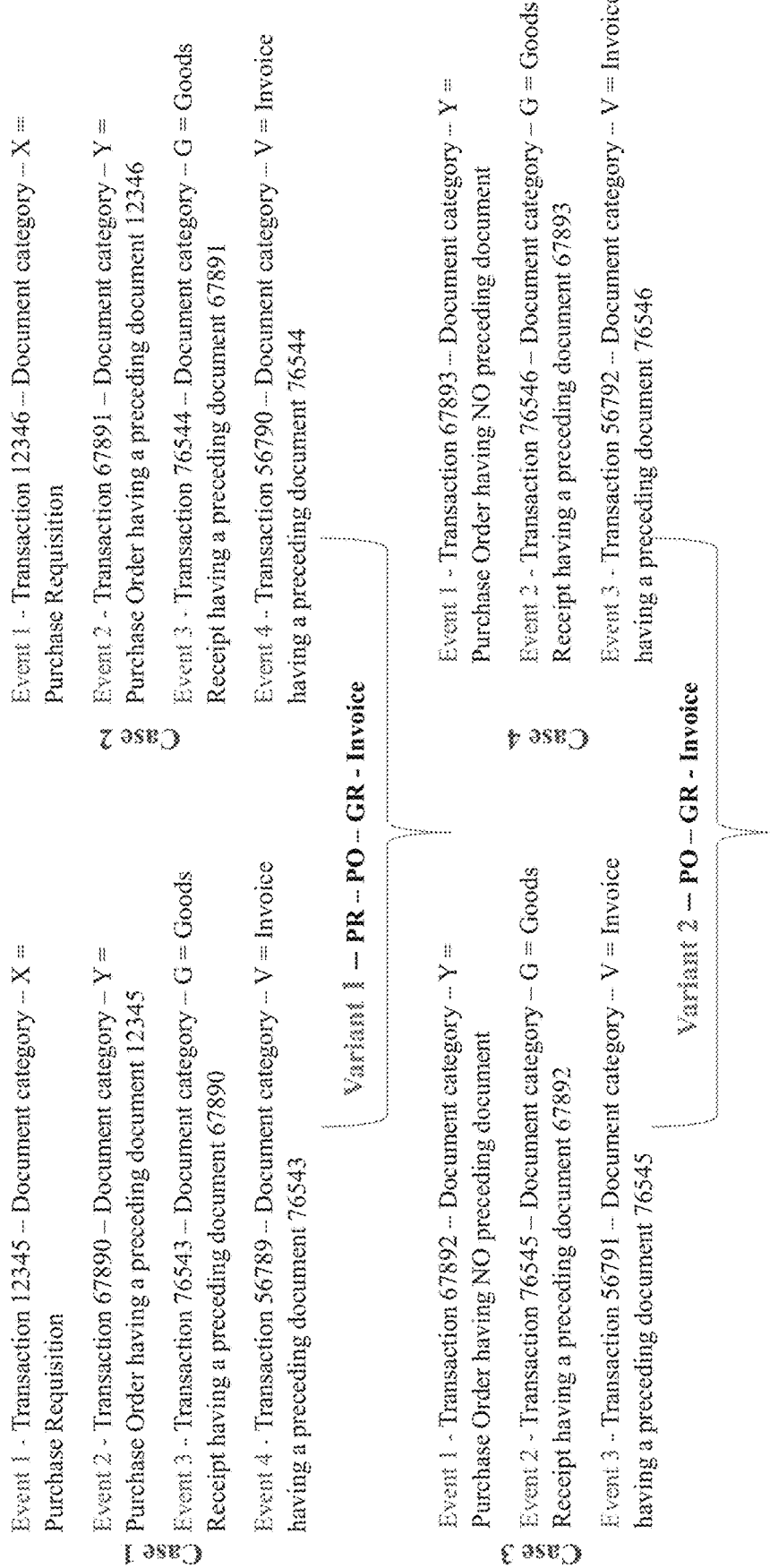
FIG. 2 shows an example of groups of transaction events and their associated variants, according to an embodiment.

FIG. 2 shows an example of groups of transaction events and their associated variants, according to an embodiment. Case 1 is a first set of grouped transaction events. Case 1 includes a set of four transaction events. Event 1 of case 1 is a first transaction event associated with a document having transaction ID 12345, document category X, and transaction event type PR. Event 2 of case 1 is a second transaction event associated with a document having transaction ID 67890, document category Y, and transaction event type PO linked to document with transaction ID 12345. Event 3 of case 1 is a third transaction event associated with a document having transaction ID 76543, document category G, and transaction event type GR linked to document with transaction ID 67890. Event 4 of case 1 is a fourth transaction event associated with a document having transaction ID 56789, document category V, and transaction event type invoice linked to document with transaction ID 76543. Together, the event transaction type pattern PR followed by PO followed by GR followed by invoice is a first variant.

Case 2 is a second set of grouped transaction events. Case 1 also includes a set of four transaction events. Event 1 of case 2 is a first transaction event associated with a document having transaction ID 12346, document category X, and transaction event type PR. Event 2 of case 2 is a second transaction event associated with a document having transaction ID 67891, document category Y, and transaction event type PO linked to document with transaction ID 12346. Event 3 of case 2 is a third transaction event associated with a document having transaction ID 76544, document category G, and transaction event type GR linked to document with transaction ID 67891. Event 4 of case 2 is a fourth transaction event associated with a document having transaction ID 56790, document category V, and transaction event type invoice linked to document with transaction ID 76544. Like case 1, case 2 is also associated with the first variant because the event transaction type pattern of case 2 is the same as the event transaction type pattern of case 1. As such, a first set of variants can include cases 1 and 2.

Case 3 is a third set of grouped transaction events. Case 3 includes a set of three transaction events. Event 1 of case 3 is a first transaction event associated with a document having transaction ID 67892, document category Y, and transaction event type PO (with no preceding document). Event 2 of case 3 is a second transaction event associated with a document having transaction ID 76545, document category G, and transaction event type GR linked to document with transaction ID 67892. Event 3 of case 3 is a third transaction event associated with a document having transaction ID 56791, document category V, and transaction event type invoice linked to document with transaction ID 76545. Together, the event transaction type pattern PO followed by GR followed by invoice is a second variant different than the first variant.

Case 4 is a fourth set of grouped transaction events. Like case 3, case 4 also includes a set of three transaction events. Event 1 of case 4 is a first transaction event associated with a document having transaction ID 67893, document category Y, and transaction event type PO. Event 2 of case 4 is a second transaction event associated with a document having transaction ID 76546, document category G, and transaction event type GR linked to document with transaction ID 67893. Event 3 of case 4 is a third transaction event associated with a document having transaction ID 56792, document category V, and transaction event type invoice linked to document with transaction ID 76546. Like case 3, case 4 is also associated with the second variant because the event transaction type pattern of case 4 is the same as the event transaction type pattern of case 3. As such, a second set of variants (different than the first set of variants above) can include cases 3 and 4.

Relating FIG. 1 to FIG. 2, the set of transaction events 112 from FIG. 1 can refer to events 1-4 of case 1, events 1-4 of case 2, events 1-3 of case 3, and events 1-3 of case 4 from FIG. 2. Additionally, the sets of grouped transaction events 114 from FIG. 1 can refer to cases 1-4 from FIG. 2, where each case from FIG. 2 is a set of grouped transaction events. The sets of variants 116 from FIG. 1 can refer to variants 1 and 2 from FIG. 2. Note that, although FIG. 2 showed 14 transaction events, four groups of transaction events (i.e., four cases), and two variants, more or less can be identified in other implementations.

FIGS. 3-7 display examples of various metrics from a process analysis output, which can be displayed via a graphical user interface in some instances. A set of data that is to be analyzed (e.g., ERP database 106) may sometimes be associated with a massive amount of data, such as millions of business transaction events. As will be shown and discussed with respect to FIGS. 3-7, one or more implementations recite improvements over known systems, resulting in an improved user interface for compute devices (e.g., PA compute device 100 and/or a compute device not shown in FIG. 1). For example, some implementations are related to presenting a limited amount of information (e.g., summarized information, only certain information) determined based on the set of data to be analyzed. Some implementations are related to determining and/or causing display of the limited set of information (e.g., net value, number of non-standard variants, sequences of transaction events that are misplaced, etc.). Such limited set of information can be advantageous in some cases. For example, a user may not be able to view the entire set of data to be analyzed using a compute device with a smaller screen, lesser processing power, lesser memory, and/or the like, but may be able to view the limited set of information using that compute device. As such, a user's and the compute device's efficiency can be improved (e.g., in analyzing the set of data to be analyzed).

Figure 3:
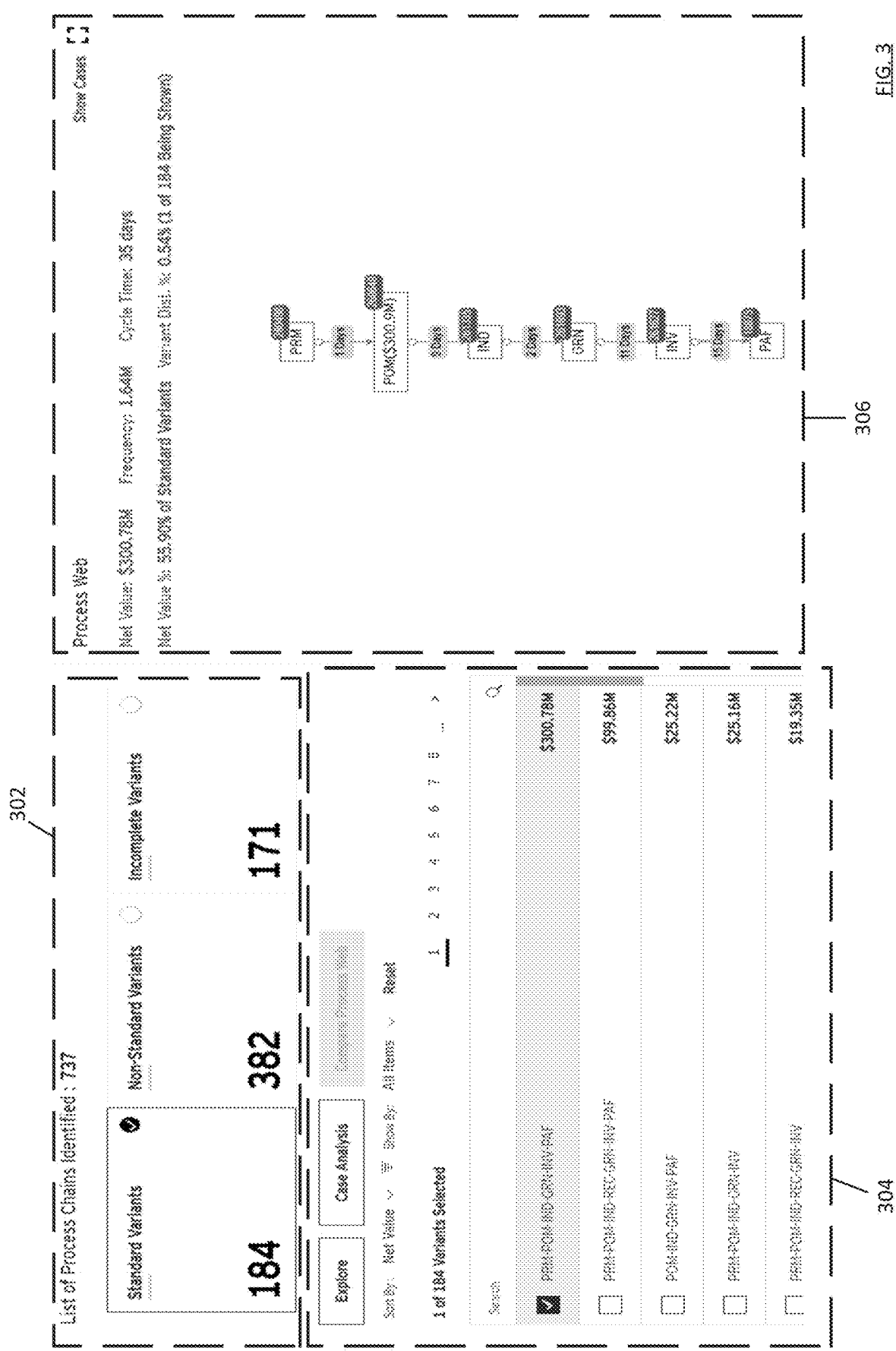
FIG. 3 shows various metrics from a process analysis output, according to an embodiment.

FIG. 3 shows various metrics from a process analysis output, according to an embodiment. In some implementations, the PA compute device 100 is configured to cause (e.g., at the PA compute device 100 and/or a compute device not shown in FIG. 3) output of information included in and/or similar to FIG. 3. Area 302 indicates that 737 variants were identified, with 184 variants being standard, 382 variants being non-standard, and 171 variants being incomplete. Area 304 shows representations of some variants, as well as net monetary value associated with those variants. For example, the variant associated with PRM-POM-IND-GRN-INV-PAF is checked in area 304, and associated with (e.g., transactions resulted in) a net value of $300.78 million (M). A user can have the ability to select other variants, see other variants, sort the variants, search for variants, and/or the like. Area 306 shows additional information associated with the variant selected at area 304. For example, area 306 shows that 1.64 M sets of grouped transaction events (i.e., cases) were identified having that variant. Area 306 also shows the average cycle time of that variant, the proportion of net value that variant has compared to all other standard variants, and a distribution associated with that variant. Area 306 also shows a visualization of one set of grouped transaction events associated with that variant, including information indicating the amount of time between pairs of linked transaction events, and the transaction ID.

Figure 4:
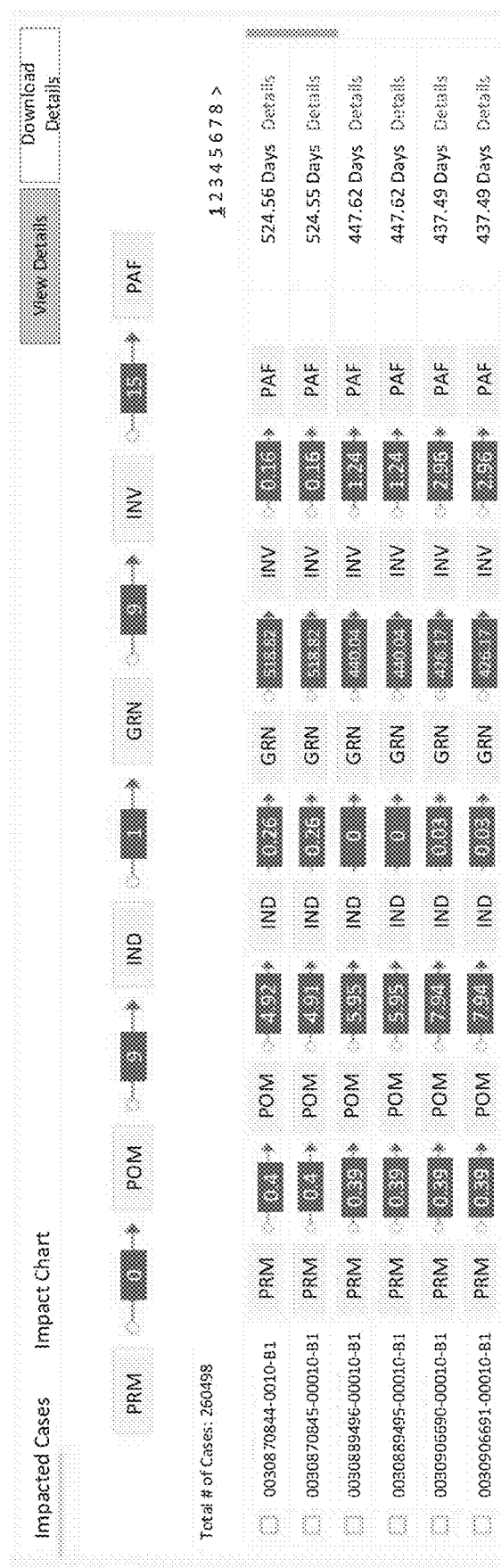
FIG. 4 shows various metrics from a process analysis output, according to an embodiment.

FIG. 4 shows various metrics from a process analysis output, according to an embodiment. FIG. 4 shows a variant with pattern PRM followed by POM followed by IND followed by GRN followed by INV followed by PAF. In the example shown in FIG. 4, the 260,498 sets of grouped transaction events (i.e., cases) with the variant were identified (note that the sets of grouped transaction events include INV following GRN, and PAF following INV, though they are not shown explicitly shown in FIG. 4). FIG. 4 shows, for each set of grouped transaction events, an identifier of that set of grouped transaction events, the number of days between subsequent pairs of transaction events for that set of grouped transaction events, and the total number of days for that set of grouped transaction events to be completed.

FIG. 5 shows various metrics from a process analysis output, according to an embodiment. FIG. 5 shows a single set of grouped transaction events, where the variant for that set of grouped transaction events is PRM followed by POM followed by IND followed by GRN followed by INV followed by PAF. FIG. 5 also shows the identifier of that set of grouped of transaction events (0030870844-00010-B1), net money value associated with that set of grouped transaction events ($59), total duration of the set of grouped transaction events (525 days), and duration of time between each subsequent pair of transaction events (0 days between PRM and POM, 5 days between POM and IND, 0 days between IND and GRN, 519 days between GRN and INV, and 0 days between INV and PAF). Regarding the net money value, each transaction event may be associated with (e.g., cause) an increase or decrease in money. In some implementation, the net money value can refer to the sum of money that is left after all transaction events for a given case (or group of cases, such as a group of cases for a given variant) have occurred. In addition, FIG. 5 shows a table indicating, for each transaction event of that case, the transaction event type for that transaction event (labelled "Event Name"), transaction event code for that transaction event (labelled "T-Code), a user associated with (e.g., that performed, that approved) that transaction event (labelled "User Name"), a document identifier associated with that transaction event indicating a unique identifier of a document (labelled "Document Number"), a page number of an associated document (labelled "Document Item No"), and a date and time that transaction event was processed (labelled "Time of Processing"). In some implementations, these values can be changed dynamically through the "Add attribute" option as desired (e.g., as specified by the PA compute device 100 and/or a different compute device not shown in FIG. 1).

Figure 6:
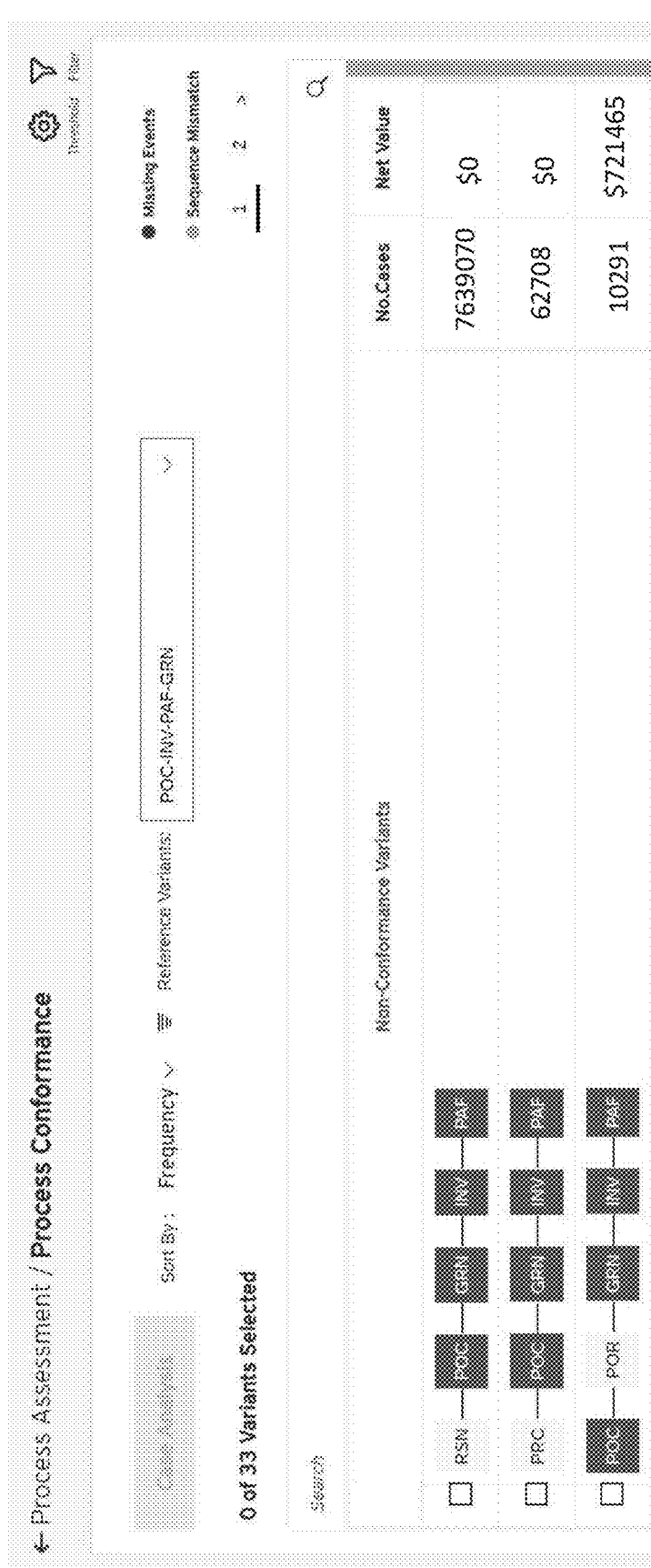
FIG. 6 shows various metrics from a process analysis output, according to an embodiment.

FIG. 6 shows various metrics from a process analysis output, according to an embodiment. FIG. 6 includes additional information about non-conformant variants (e.g., non-standard variants 120 and/or incomplete variants 122). In some implementations, identifying non-conformant variants is related to identifying the business processes that do and/or do not follow a set of predetermined best practices (e.g., ERP best practices). For example, an ERP best practice may be to always invoice after a GR is created. A GR occurring after an invoice is created may then be considered a non-conforming case (e.g., non-standard). In some implementations, as shown in FIG. 6, the PA compute device 100 can, for each non-conforming variant, indicate why that non-conforming variant is non-conforming (e.g., missing a transaction event, a sequence of transaction events is incorrect, etc.), indicate the number of cases (i.e., sets of grouped transaction events) associated with that non-conforming variant, and indicate a net value of transactions associated with that non-conforming variant.

In some implementations, each time an output similar to FIG. 6 is generated (e.g., at each refresh), the PA compute device 100 automatically compares all the variants (e.g., sets of variants 116) with a set of reference variants (e.g., reference standard variants), and identifies missing transaction events and/or transaction events that are misplaced based on the set of reference variants. In some implementations, a user can also have the option to select a variant and see additional details about cases associated with the selected variant, filter variants (e.g., according to company code, sales organization, net value number of cases, etc.).

The process analysis discussed with respect to FIG. 6 allows for identification of non-conformant business processes from, for example, millions of data that otherwise involves a high number of man hour effort and high potential probability of error. Automatic identification of the non-conformant authenticates the process of identification, and accelerates the process of identification of the root cause of the non-conformance.

Figure 7:
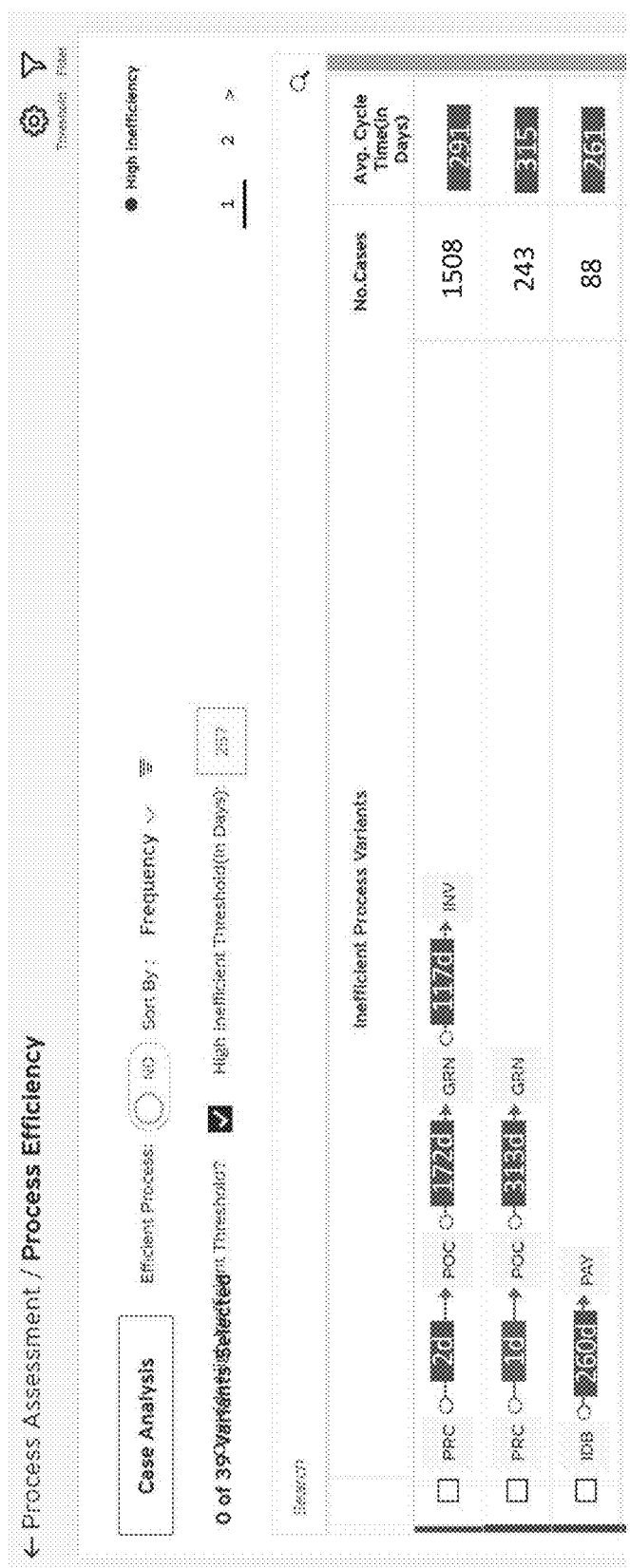
FIG. 7 shows various metrics from a process analysis output, according to an embodiment.

FIG. 7 shows various metrics from a process analysis output, according to an embodiment. As shown in FIG. 7, the PA compute device 100 can identify inefficient process variants. FIG. 7 shows a list of three different variants identified as inefficient, the average number of days between subsequent transaction events of those variants, the number of cases associated with each of those variants, and the average cycle time of those variants. In some implementations, a variant is considered inefficient if the average cycle time is greater than a threshold value.

In some implementations, the threshold value can be calculated. For example, the PA compute device 100 can calculate the overall cycle time of each set of grouped transaction events (i.e., cases), determine a benchmark time (e.g., the lowest/fastest cycle time), and compare the overall cycle time of other sets of grouped transaction events with the benchmark time. As another example, the PA compute device 100 can calculate, for each transaction event type, the average and/or fastest amount of time before a subsequent transaction event linked to a transaction event of that transaction event type occurred, and use that average and/or fastest amount of time as a benchmark to compare to other instances of transaction events being that transaction event type. In some implementations, the threshold value can be provided by and/or overridden by a user. For example, as shown in FIG. 7, the threshold time is input at 257. Because the average cycle time for each of the variants is greater than 257 days (291 days, 315 days, and 261 days), each variant has been identified as inefficient. Although not explicitly shown in FIG. 7, in some implementations, a threshold value can also and/or alternatively be provided between a pair of transaction events (e.g., where the pair of transaction events are selected by a user). In some implementations, the threshold value can change over time (e.g., automatically and without a human indicating the new threshold value). For example, as sets of grouped transaction events associated with a variant get faster or slower over time, the threshold value can update accordingly (e.g., to account for the "new normal"). For instance, an organization using a new and faster invoice generating software may result in invoices being generated faster, or an organization firing a large portion of their manufacturing workforce may result in orders being manufactured slower; such changes may be identified (e.g., by identifying a predetermined number of consecutive days for a transaction event being faster or slower), and result in the changing of the threshold value.

FIG. 8 shows a flowchart of a method 800 for identifying and displaying metrics associated with variants, according to an embodiment. In some implementations, method 800 is performed by a processor (e.g., processor 102).

At 801, a transaction dataset (e.g., transaction dataset 110) is analyzed to identify a set of transaction events (e.g., set of transaction events 112). The set of transaction events can include any number of transaction events, such as more than 100, more than 100,000, more than 1 M, more than 10 M and/or the like. Each transaction event from the set of transaction events is associated with a transaction event type from a set of transaction event types. In some implementations, the set of transaction event types includes at least one of a purchase requisition (PR), a purchase order (PO), a goods receipt (GR), a post good return (PGR), or an invoice. In some implementations, the transaction dataset is included in an in-memory, column-oriented, relational database management system. The transaction dataset may be a dataset that has been extracted and/or transformed from a database (e.g., ERP database 106).

At 802, the set of transaction events are analyzed, based on associations between transaction events from the set of transaction events, to identify a plurality of sets of grouped transaction events (e.g., sets of grouped transaction events 114). Each set of grouped transaction events from the plurality of sets of grouped transaction events is associated with a subset of transaction events from the set of transaction events (e.g., that are mutually exclusive or that overlap). In some implementations, each transaction event from the set of transaction events includes an indication of a preceding or succeeding document that is associated with a different transaction event from the set of transaction events, where the indications of preceding and/or succeeding documents are used to identify the plurality of sets of grouped transaction events. In some implementations, 802 is performed automatically (e.g., without requiring human intervention) in response to completing 801. In some implementations, each transaction event from the set of transaction events is further associated with a different transaction identifier, a document number, and a time (see, e.g., FIG. 5).

At 803, to identify a plurality of sets of variants (e.g., sets of variants 116), each set of grouped transaction events from the plurality of sets of grouped transaction events including an identifier of a variant for that set of grouped transaction events and from the plurality of sets of variants is analyzed. Each set of variants from the plurality of sets of variants differs from each remaining set of variants from the plurality of sets of variants. Each set of variants from the plurality of sets of variants can be associated with one or more grouped transaction events from the plurality of sets of variants, where each of the one or more grouped transaction events is associated with a pattern of event transaction types the same as all other grouped transaction events from the one or more grouped transaction events. In some implementations, 803 is performed automatically in response to completing 802.

At 804, the plurality of sets of variants is analyzed to identify (1) a subset of standard variants (e.g., standard variants 118) from the plurality of sets of variants having a standard sequence of transaction event types, (2) a subset of non-standard variants (e.g., non-standard variants 120) from the plurality of sets of variants having a non-standard sequence of transaction event types, and (3) a subset of incomplete variants (e.g., incomplete variants 122) from the plurality of sets of variants having an incomplete sequence of transaction event types. In some implementations, what is considered standard, non-standard, and incomplete can be previously-defined (or previously-selected) and based on known best practices and/or human input. In some implementations, 804 is performed automatically in response to completing 803.

At 805, at least one of a representation quantifying the subset of standard variants, a representation quantifying the subset of non-standard variants, or a representation quantifying the subset of incomplete variants is caused to be displayed (see, e.g., FIG. 3). In some implementations, causing to display includes sending an electronic signal to a compute device (e.g., PA compute device 100 and/or a compute device not known in FIG. 1), where the compute device is configured to display the representation in response to receiving the signal. In some implementations, 805 is performed automatically in response to completing 804.

At 806, a set of metrics associated with each set of variants from the plurality of sets of variants is identified. For example, the set of metrics can include a total time duration for that set of variants, a time duration between preceding and succeeding transaction events, a net monetary value associated with that set of variants that can be filtered based on variants and sub-variants, and/or the like.

At 807, a representation of the set of metrics is caused to be displayed. In some implementations, causing to display includes sending an electronic signal to a compute device (e.g., PA compute device 100 and/or a compute device not known in FIG. 1), where the compute device is configured to display the representation of the set of metrics in response to receiving the signal. Examples of the representation of the set of metrics are shown in FIGS. 3-7.

Some implementations of method 800 further comprise identifying, for each set of grouped transaction events from the plurality of sets of grouped transaction events, and for each pair of subsequent transaction events included in that set of grouped transaction events, a duration of time between that pair of subsequent transaction events. Some implementations of method 800 further comprise causing display of a representation of the duration of time between that pair of subsequent transaction events. Some implementations further comprise identifying that the duration of time between that pair of subsequent transaction events is greater than a predetermined threshold. Some implementations further comprise sending, in response to the identifying that the duration of time between that pair of subsequent transaction events is greater than the predetermined threshold, a signal to cause at least one remedial action to be performed.

Some implementations of method 800 further comprise, for each incomplete variant from the subset of incomplete variants, identifying at least one missing transaction event type for that incomplete variant, and causing display of a representation of the at least one missing transaction event type for that incomplete variant. Some implementations of method 800 further comprise, for each non-standard variant from the subset of non-standard variants, identifying at least one non-standard transaction event type sequence for that non-standard variant, and causing display of a representation of the at least one non-standard transaction event type for that incomplete variant.

Some implementations of method 800 further comprise determining, for at least one set of grouped transaction events from the plurality of sets of grouped transaction events, a total duration for the at least one set of grouped transaction events. Some implementations further comprise causing display of a representation of the at least set of grouped transaction events and the total duration for the at least one set of grouped transaction events.

FIG. 9 shows a flowchart of a method 900 for identifying and displaying metrics associated with variants, according to an embodiment. In some implementations, method 900 is performed by a processor (e.g., processor 102).

At 901, a plurality of transaction events (e.g., set of transaction events) are analyzed to identify a first set of grouped transaction events (e.g., included as a set in the sets of grouped transaction events 114) from the plurality of transaction events. The first set of grouped transaction events include a first sequence of transaction event types. The first sequence of transaction event types includes a first transaction event type followed by a second transaction event type followed by a third transaction event type. For example, the first transaction event type may be associated with a first document linked to a second document associated with the second transaction event type, and the second transaction event type may be associated with a third document linked to a third document associated with the third transaction event type. The plurality of transaction events may be and/or have been included in a transaction dataset (e.g., transaction dataset 110) that was extracted and/or transformed from a database (e.g., ERP database 106).

At 902, the plurality of transaction events are analyzed to identify a second set of grouped transaction events (e.g., included as a set in the sets of grouped transaction events 114) from the plurality of transaction events. The second set of grouped transaction events includes a second sequence of transaction event types. The second sequence of transaction event types includes a fourth transaction event type followed by a fifth transaction event type followed by a sixth transaction event type. For example, the fourth transaction event type may be associated with a fourth document linked to a fifth document associated with the fifth transaction event type, and the fifth transaction event type may be associated with a sixth document linked to a sixth document associated with the sixth transaction event type. In some implementations, 901 and 902 occur at least partially in parallel.

At 903, a determination is made, based on the first sequence of transaction event types, that the first set of grouped transaction events is associated with a first variant (e.g., included in the sets of variants 116). In some implementations, 903 can occur automatically in response to completing 901.

At 904, a determination is made, based on the second sequence of transaction event types, that the second set of grouped transaction events is associated with a second variant (e.g., included in the sets of variants 116). In some implementations, 904 can occur automatically in response to completing 903.

At 905, a first set of time durations is determined. The first set of time durations includes (1) a time duration between the first transaction event type and the second transaction event type, and (2) a time duration between the second transaction event type and the third transaction event type. At 906, a second set of time durations is determined. The second set of time durations includes (1) a time duration between the fourth transaction event type and the fifth transaction event type, and (2) a time duration between the fifth transaction event type and the sixth transaction event type. In some implementations, 905 and 906 occur at least partially in parallel.

At 907, a representation of the first sequence of transaction event types and the first set of time durations is caused to be displayed. At 908, a representation of the second sequence of transaction event types and the second set of time durations is caused to be displayed. In some implementations, causing to display includes sending an electronic signal to a compute device (e.g., PA compute device 100 and/or a compute device not known in FIG. 1), where the compute device is configured to display the representation of the first sequence of transaction event types, the first set of time durations, the second sequence of transaction event types, and/or the second set of time durations in response to receiving the signal. In some implementations, 907 and 908 occur at least partially in parallel.

In some implementations of method 900, one of (e.g., and not two or three of) (1) the first transaction event type is identical to the fourth transaction event type, (2) the second transaction event type is identical to the fifth transaction event type, or (3) the third transaction event type is identical to the sixth transaction event type. In some implementations of method 900, two of (e.g., and not one or three of) (1) the first transaction event type is identical to the fourth transaction event type, (2) the second transaction event type is identical to the fifth transaction event type, or (3) the third transaction event type is identical to the sixth transaction event type. In some implementations of method 900, the first event transaction type is different than the fourth transaction event type, the second transaction event type is different than the fifth transaction event type, and the third transaction event type is different than the sixth transaction event type.

Some implementations of method 900 further include determining that the time duration between the first transaction event type and the second transaction event type is outside a predetermined acceptable range (e.g., based on a weighted average value, based on user input, etc.). Some implementations further include sending, in response to the determining that the time duration between the first transaction event type and the second transaction event type is outside the predetermined acceptable range, a signal to cause a recommendation to be output (e.g., cancel transaction, perform a particular transaction event, etc.).

FIG. 10 shows a flowchart of a method 1000 for identifying and displaying metrics associated with variants, according to an embodiment. In some implementations, method 1000 is performed by a processor (e.g., processor 102).

At 1001, transaction data (e.g., transaction dataset 110) associated with a process is received. The transaction data is filtered (and/or converted) from a database (e.g., ERP database 106) including data associated with a plurality of processes that includes the process (e.g., using extractor 108). In some implementations of method 1000, the transaction data is stored in a text file.

At 1002, the transaction data is analyzed to identify a set of transaction events (e.g., set of transaction events 112). Each transaction event from the set of transaction events is associated with a transaction event type from a set of transaction event types. In some implementations, 1002 is performed automatically (e.g., without requiring human intervention) in response to completing 1001.

At 1003, the set of transaction events is analyzed to identify a plurality of sets of grouped transaction events (e.g., sets of grouped transaction events 114). Each set of grouped transaction events from the plurality of sets of grouped transaction events includes a subset of transaction events from the set of transaction events (e.g., that are mutually exclusive or that overlap). In some implementations, 1003 is performed automatically (e.g., without requiring human intervention) in response to completing 1002.

At 1004, each set of grouped transaction events from the plurality of sets of grouped transaction events including an identifier of a variant for that set of grouped transaction events is analyzed to identify a plurality of sets of variants (e.g., sets of variants 116). Each set of variants from the plurality of sets of variants differs from each remaining set of variants from the plurality of sets of variants. In some implementations, 1004 is performed automatically in response to completing 1003.

At 1005, the plurality of sets of variants is analyzed to identify a set of variants from the plurality of sets of variants not having a standard sequence of transaction event types (e.g., non-standard variants 120 and/or incomplete variants 122). In some implementations, 1005 is performed automatically (e.g., without requiring human intervention) in response to completing 1004.

At 1006, a first set of metric values associated with the set of variants is calculated. For example, the first set of metrics can include a net value associated with the set of variants, a frequency of cases for the set of variants, an average cycle time for the set of variants, an average duration of time between subsequent transaction events for the set of variants, and/or the like (see, e.g., area 304 and 306 of FIG. 3, or FIG. 7). In some implementations, 1006 is performed automatically (e.g., without requiring human intervention) in response to completing 1005.

At 1007, a second set of metric values associated with a set of grouped transaction events associated with the set of variants is calculated. For example, the second set of metric values can include the cycle time for the set of grouped transaction events, net value associated with the set of grouped transaction events, an average duration of time between subsequent transaction events for the set of variants, and/or the like (see, e.g., FIGS. 4 and/or 5). In some implementations, 1006 is performed automatically (e.g., without requiring human intervention) in response to completing 1005 and/or 1006.

At 1008, a determination is made that at least one of (1) the first set of metric values is outside a first predetermined acceptable range, or (2) the second set of metric values is outside a second predetermined acceptable range. In some implementations, the predetermined acceptable range is provided by a user (e.g., manager, accountant, engineer, etc.) In some implementations, the predetermined acceptable range is determined without human intervention (e.g., calculated as a weighted average). In some implementations, 1008 is performed automatically (e.g., without requiring human intervention) in response to completing 1006 and 1007.

At 1009, in response to the determining, a signal is sent to cause a remedial action to be performed. Examples of remedial action include causing an alert to be generated, cancelling (or causing to cancel) a transaction, initiating (or triggering) a transaction event to occur, automatically updating a transaction procedure, and/or the like. In some implementations, causing the remedial action to be performed includes sending an electronic signal to a compute device (e.g., PA compute device 100 and/or a compute device not known in FIG. 1), where the compute device is configured to perform the remedial action in response to receiving the signal. In some implementations, 1009 is performed automatically (e.g., without requiring human intervention) in response to completing 1008.

Some implementations of method 1000 further comprise sending a first signal to cause display of a representation quantifying the set of variants not having the standard sequence of transaction event types. Some implementations further comprise sending a second signal to cause display of the first set of metric values. Some implementations further comprise sending a third signal to cause display of the second set of metric values.

In some implementations of method 1000, the process is one of a procurement process, a production process, a distribution process, an accounting process, a human resource process, a sales process, or a customer service process. In some implementations of method 1000, the plurality of processes includes a procurement process, a production process, a distribution process, an accounting process, a human resource process, a sales process, and a customer service process.

All combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™ and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

In some implementations, a network can be any suitable communications network for transferring data, operating over public and/or private networks. For example, a network can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, a network can be a wireless network such as, for example, a Wi-Fi or wireless local area network ("WLAN"), a wireless wide area network ("WWAN"), and/or a cellular network. In other instances, a network can be a wired network such as, for example, an Ethernet network, a digital subscription line ("DSL") network, a broadband network, and/or a fiber-optic network. In some instances, the network can use Application Programming Interfaces (APIs) and/or data interchange formats, (e.g., Representational State Transfer (REST), JavaScript Object Notation (JSON), Extensible Markup Language (XML), Simple Object Access Protocol (SOAP), and/or Java Message Service (JMS)). The communications sent via the network can be encrypted or unencrypted. In some instances, the network can include multiple networks or subnetworks operatively coupled to one another by, for example, network bridges, routers, switches, gateways and/or the like.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. A non-transitory processor-readable medium storing code representing instructions to be executed by one or more processors, the instructions comprising code to cause the one or more processors to:
receive transaction data associated with a process, the transaction data filtered from a database including data associated with a plurality of processes that includes the process;
analyze the transaction data to identify a set of transaction events, each transaction event from the set of transaction events associated with a transaction event type from a set of transaction event types;
analyze the set of transaction events to identify a plurality of sets of grouped transaction events, each set of grouped transaction events from the plurality of sets of grouped transaction events including a subset of transaction events from the set of transaction events;
analyze, to identify a plurality of sets of variants, each set of grouped transaction events from the plurality of sets of grouped transaction events including an identifier of a variant for that set of grouped transaction events, each set of variants from the plurality of sets of variants (1) differing from each remaining set of variants from the plurality of sets of variants and (2) representing a sequence of transaction event types for a set of grouped transaction events from the plurality of sets of grouped transaction events that are associated with that set of variants;
analyze the plurality of sets of variants to identify a set of variants from the plurality of sets of variants not having a standard sequence of transaction event types;
calculate a first set of metric values associated with the set of variants;
calculate a second set of metric values associated with a set of grouped transaction events from the plurality of sets of grouped transaction events that are associated with the set of variants;
determine that at least one of (1) the first set of metric values is outside a first predetermined acceptable range, or (2) the second set of metric values is outside a second predetermined acceptable range;
send, in response to the determining, a signal to cause a remedial action to be performed;
determine that a total number of variants in the set of variants from the plurality of sets of variants not having the standard sequence of transaction event types is greater than a predetermined threshold; and
prevent, without human intervention, a future transaction in response to determining that the total number is greater than the predetermined threshold.

2. The non-transitory processor-readable medium of claim 1, wherein the transaction data is stored in a text file, and the database is an enterprise resource planning database.

3. The non-transitory processor-readable medium of claim 1, wherein the instructions further comprise code to cause the one or more processors to:
send a first signal to cause display of a representation quantifying the set of variants not having the standard sequence of transaction event types;
send a second signal to cause display of the first set of metric values; and
send a third signal to cause display of the second set of metric values.

4. The non-transitory processor-readable medium of claim 1, wherein the process is one of a procurement process, a production process, a distribution process, an accounting process, a human resource process, a sales process, or a customer service process.

5. A method, comprising:
analyzing, via a processor, a transaction dataset to identify a set of transaction events, each transaction event from the set of transaction events associated with a transaction event type from a set of transaction event types;
analyzing, via the processor and based on associations between transaction events from the set of transaction events, the set of transaction events to identify a plurality of sets of grouped transaction events, each set of grouped transaction events from the plurality of sets of grouped transaction events associated with a subset of transaction events from the set of transaction events;
analyzing, via the processor and to identify a plurality of sets of variants, each set of grouped transaction events from the plurality of sets of grouped transaction events including an identifier of a variant for that set of grouped transaction events and from the plurality of sets of variants, each set of variants from the plurality of sets of variants (1) differing from each remaining set of variants from the plurality of sets of variants and (2) representing a sequence of transaction event types for a set of grouped transaction events from the plurality of sets of grouped transaction events that are associated with that set of variants;

analyzing, via the processor, the plurality of sets of variants to identify (1) a subset of standard variants from the plurality of sets of variants having a standard sequence of transaction event types, (2) a subset of non-standard variants from the plurality of sets of variants having a non-standard sequence of transaction event types, and (3) a subset of incomplete variants from the plurality of sets of variants having an incomplete sequence of transaction event types;

causing, via the processor, display of at least one of a representation quantifying the subset of standard variants, a representation quantifying the subset of non-standard variants, or a representation quantifying the subset of incomplete variants;

identifying, via the processor, a set of metrics associated with each set of variants from the plurality of sets of variants;

causing, via the processor, display of a representation of the set of metrics;

determining that a total number of variants from the plurality of sets of variants not having the standard sequence of transaction event types is greater than a predetermined threshold; and preventing, without human intervention, a future transaction in response to determining that the total number is greater than the predetermined threshold.

6. The method of claim 5, wherein, for each set of variants from the plurality of sets of variants, the set of metrics includes a net monetary value associated with that set of variants.

7. The method of claim 5, wherein each transaction event from the set of transaction events is further associated with a different transaction identifier, a document number, and a time.

8. The method of claim 5, wherein the set of transaction event types includes at least one of a purchase requisition, a purchase order, a goods receipt, a post good return, or an invoice.

9. The method of claim 5, further comprising:
identifying, via the processor, for each set of grouped transaction events from the plurality of sets of grouped transaction events, and for each pair of subsequent transaction events included in that set of grouped transaction events, a duration of time between that pair of subsequent transaction events; and
causing, via the processor, display of a representation of the duration of time between that pair of subsequent transaction events.

10. The method of claim 9, wherein the predetermined threshold is a first predetermined threshold, the method further comprising:
identifying, via the processor, that the duration of time between that pair of subsequent transaction events is greater than a second predetermined threshold; and
sending, via the processor and in response to the identifying that the duration of time between that pair of subsequent transaction events is greater than the second predetermined threshold, a signal to cause at least one remedial action to be performed.

11. The method of claim 5, further comprising:
for each incomplete variant from the subset of incomplete variants:
identifying, via the processor, at least one missing transaction event type for that incomplete variant; and
causing, via the processor, display of a representation of the at least one missing transaction event type for that incomplete variant.

12. The method of claim 5, further comprising:
for each non-standard variant from the subset of non-standard variants:
identifying, via the processor, at least one non-standard transaction event type sequence for that non-standard variant; and
causing, via the processor, display of a representation of the at least one non-standard transaction event type for that incomplete variant.

13. The method of claim 5, wherein the transaction dataset is included in an in-memory, column-oriented, relational database management system.

14. The method of claim 5, further comprising:
determining, via the processor and for at least one set of grouped transaction events from the plurality of sets of grouped transaction events, a total duration for the at least one set of grouped transaction events; and
causing, via the processor, display of a representation of the at least set of grouped transaction events and the total duration for the at least one set of grouped transaction events.

15. An apparatus comprising:
a memory; and
a processor operatively coupled to the memory, the processor configured to:
analyze a plurality of transaction events to identify a first set of grouped transaction events from the plurality of transaction events, the first set of grouped transaction events including a first sequence of transaction event types, and the first sequence of transaction event types including a first transaction event type followed by a second transaction event type followed by a third transaction event type;
analyze the plurality of transaction events to identify a second set of grouped transaction events from the plurality of transaction events, the second set of grouped transaction events including a second sequence of transaction event types, and the second sequence of transaction event types including a fourth transaction event type followed by a fifth transaction event type followed by a sixth transaction event type;
determine, based on the first sequence of transaction event types, that the first set of grouped transaction events is associated with a first variant, the first variant representing groups of transaction events from the plurality of transaction events having the first sequence of transaction event types;
determine, based on the second sequence of transaction event types, that the second set of grouped transaction events is associated with a second variant, the second variant representing groups of transaction events from the plurality of transaction events having the second sequence of transaction event types;
determine a first set of time durations, the first set of time durations including (1) a time duration between the first transaction event type and the second transaction event type, and (2) a time duration between the second transaction event type and the third transaction event type;

determine a second set of time durations, the second set of time durations including (1) a time duration between the fourth transaction event type and the fifth transaction event type, and (2) a time duration between the fifth transaction event type and the sixth transaction event type;

cause display of a representation of the first sequence of transaction event types and the first set of time durations;

cause display of a representation of the second sequence of transaction event types and the second set of time durations;

determine that the time duration between the first transaction event type and the second transaction event type is outside a predetermined acceptable range;

send, in response to the determining that the time duration between the first transaction event type and the second transaction event type is outside the predetermined acceptable range, a signal to cause a recommendation to be output;

determine that at least one of the first variant or the second variant is a non-standard variant based on a predetermined standard, the predetermined standard including an indication that at least one of: the first transaction event type is after the second transaction event type, the first transaction event type is after the third transaction event type, the second transaction event type is after the third transaction event type, the fourth transaction event type is after the fifth transaction event type, the fourth transaction event type is after the sixth transaction event type, or the fifth transaction event type is after the sixth transaction event type;

determine that a total number of non-standard variants is greater than a predetermined threshold; and prevent, without human intervention, a transaction in response to determining that the total number is greater than the predetermined threshold.

16. The apparatus of claim 15, wherein one of (1) the first transaction event type is identical to the fourth transaction event type, (2) the second transaction event type is identical to the fifth transaction event type, or (3) the third transaction event type is identical to the sixth transaction event type.

17. The apparatus of claim 15, wherein two of (1) the first transaction event type is identical to the fourth transaction event type, (2) the second transaction event type is identical to the fifth transaction event type, or (3) the third transaction event type is identical to the sixth transaction event type.

18. The apparatus of claim 15, wherein the first transaction event type is different than the fourth transaction event type, the second transaction event type is different than the fifth transaction event type, and the third transaction event type is different than the sixth transaction event type.

19. The non-transitory processor-readable medium of claim 1, wherein preventing the future transaction includes modifying a website associated with the future transaction.

20. The non-transitory processor-readable medium of claim 1, wherein preventing the future transaction includes disabling a compute device from at least one of receiving the future transaction or executing the future transaction.

* * * * *